United States Patent
Wiegand

(10) Patent No.: US 6,968,293 B2
(45) Date of Patent: Nov. 22, 2005

(54) METHOD AND APPARATUS FOR OPTIMIZING EQUIPMENT MAINTENANCE

(75) Inventor: Bodo Wiegand, Wuppertal (DE)

(73) Assignee: Juisclan Holding GmbH, Hilden (DE)

( * ) Notice: Subject to any disclaimer, the term of this patent is extended or adjusted under 35 U.S.C. 154(b) by 225 days.

(21) Appl. No.: 09/997,248

(22) Filed: Nov. 30, 2001

(65) Prior Publication Data

US 2003/0004765 A1 Jan. 2, 2003

Related U.S. Application Data

(60) Provisional application No. 60/251,522, filed on Dec. 7, 2000.

(51) Int. Cl.$^7$ ............................ G06F 11/30; G06F 19/00
(52) U.S. Cl. ........................ 702/184; 700/174; 700/177; 702/185
(58) Field of Search .............................. 702/182–185; 700/174, 177, 26, 28–31

(56) References Cited

U.S. PATENT DOCUMENTS

| | | | | | |
|---|---|---|---|---|---|
| 5,586,252 | A | * | 12/1996 | Barnard et al. | 714/48 |
| 5,642,296 | A | * | 6/1997 | Saxena | 702/84 |
| 5,940,298 | A | * | 8/1999 | Pan et al. | 700/100 |
| 6,012,152 | A | * | 1/2000 | Douik et al. | 714/26 |
| 6,505,145 | B1 | * | 1/2003 | Bjornson | 702/185 |
| 6,633,782 | B1 | * | 10/2003 | Schleiss et al. | 700/26 |

* cited by examiner

Primary Examiner—Marc S. Hoff
Assistant Examiner—Paul Kim
(74) Attorney, Agent, or Firm—Nixon Peabody LLP; David S. Safran

(57) ABSTRACT

The modularized maintenance system and method of the invention provides a feedback control system in which the efficiency of the maintenance work is monitored and recorded. The method and system adjusts the maintenance system through the modification of strategies, methods and/or equipment.

24 Claims, 24 Drawing Sheets

| Components | TPM | RCM |
|---|---|---|
| Focus on important machines | no | Yes |
| Creation of inspection methods for the equipment | no | Yes |
| Individual determination of the maintenance strategy | no | yes |
| Tips on the use of diagnostic methods | yes | yes |
| Creation of spare part management | no | only general tips |
| Instructions on inclusion of sub-companies | yes | No |
| Tips for constructive modifications | yes | Yes |
| Instructions for formation of redundancies | no | Yes |
| Tips for the speedy replacement of construction groups | yes | Yes |
| Description of maintenance tasks | Inspection and servicing (not including repairs) | Inspection and servicing (not including repairs) |
| Tips for increased productivity | no | No |
| Determination of time needed | no | No |
| Determination of implementation responsibility | Yes | Yes |
| Determination of implementation intervals | Yes | Yes |
| Employee instruction | Yes | yes |
| Further training for employees | Yes | yes |
| Adaptation of construction organization | No | No |

FIG. 1
(PRIOR ART)

Current Damage Cause Evaluation and Classification

| Damage Description | No. | Potential Results | S | Potential Causes (wear & tear) | O | Preventative and Inspection Measures | D | RPN |
|---|---|---|---|---|---|---|---|---|
| Passage groove too small | 1 | Collision alarm through approaching of switch tongue | 4 | Bent switch tongue | 6 | Measurement of passage groove | 6 | |
| | 2 | Broken switch tongue due to running up against switch tongue | 9 | Assembly defect in control mechanism | 3 | Acceptance inspection for maintenance work by external companies | 7 | |
| | 3 | Wheels strike the switch tongue (overriding of the rail) | 6 | | | | | |

FIG. 10

| Damage Description | | | Current Damage Cause Evaluation and Classification | | | | |
|---|---|---|---|---|---|---|---|
| | No. | Potential Results | S | Potential Causes (wear & tear) | O | Preventative and Inspection Measures | D | RPN |
| Passage groove too small | 1 | Collision alarm through approaching of the switch tongue | 4 | Bent switch tongue | 6 | Measurement of passage groove | 6 | 360 |
| | 2 | Broken switch tongue due to running up against the switch tongue | 9 | Assembly defect in control mechanism | 3 | Acceptance of the repair by an outside company | 7 | 210 |
| | 3 | Wheels strike the switch tongue (overriding of rail) | 10 | | | | | |

FIG. 11

| No. | Equip-ment | Problem | Measure Proposal from FMEA Workshop | In charge | Date | Comments |
|---|---|---|---|---|---|---|
| 1.1 | Switch | Stiffness of switch in interlock or due to inadequately lubricated slide chairs | Equipping of the switches with latch fastenings and roller slide chairs in critical systems | Mr. Schmitz | 06/2001 | Budget of DM 50,000 authorized by management |
| 1.2 | Switch | Defective connecting and locking elements | Use self-locking transmission and connecting elements | Mr. Schultz | 12/2001 | Only No. 237 screws to be used |

| | | R 65 | UIC 80 |
|---|---|---|---|
| Basic conceptions | Track shape | | • |
| | Travel surf, inclinat. | Rails with asymmetrical head with incl. 1:40 • | Normal rails with 1:40 inclination |
| | Geometrical shape | Circular arc switch | Clothold switch |
| Drive | Pos. | (•) | Drive on outside (integrated into tie) • |
| | Basic princ. | Electrical • | Locally set mechanically |
| | Str. shape | Electromech. with toothed rack | Electrohydraulic power transmission • |
| | Design | Modular design (•) | Variably adjustable • |
| Actuating force Transmis. | Basic princ. | Single drive | Central drive with hydraulic power transmiss. (Hydrolink) • |
| Locking | Pos. | Fastening on inside | Fastening on outside in fastening tie • |
| Safety Interlocking (2nd trail level) | Str. shape | Low-maintenance fastening (WKV) (latch fastening) • | Sliding clamp fastening |
| | Basic princ. | Interlocking of tongue tester in drive • | Tongue connector rod electrically monitored |
| Stat. discrep. monitor. | Basic princ. | Electromech. tongue stat. discrep. monitor • | Limit switch (French/Czech system) |
| | Peak fastening version | Status tester in drive • | |
| | Medium fastening version | Tongue tester R=500 • | |
| | Str. | Without temp. balancing poss. | New tester rod • |
| Clear signal | Basic princ. | Axlecounter • | 100 hz bond wire (•) |

FIG. 23

| Worker qualifications | Activity | Progress | Cell | Care Time | Preparatory Time | Travel Time | Waiting Time | Personnel Time | Idle Time | Lost Time | Limiting Factors | Module | Remarks |
|---|---|---|---|---|---|---|---|---|---|---|---|---|---|
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |

Name
Module mark
Module description

Weather
Network
Date

| Switches | | | | | | Time limits acc. to load codes | | | | |
|---|---|---|---|---|---|---|---|---|---|---|
| Module number | Module | Module contents | Machines devices additional personnel | Module time/ unit (Format minute) | Number of employees/ qualifications | CST 91 Tw 1 low | CST 92 Tw 1 normal | CST 92 Tw 2 normal | CST 93 Tw 3 high | CST 93 Tw 4 high | Bill of quantities |
| INWE 300.1.93.4 | Switch 190 to 300 electr. (Time limit 1)[St] | Single switch with electric drive radius 190 to 300 m maintenance, inspection, functional check and general details acc. to DS 892.03 Appendix 02 Appendix 03 | | 11 Mai | 1 WMech (Certif. acc. to 821.2005) 1 Wmech | | | | 1 | 1 | Single switch 1 electric drive Iso joints, track connection cables, meshing and grounding 1 peak fastening switch heating system |
| INWE 300.2.92.1.2.93.3.4 | Switch 190 to 300 electr. (Time limit 2)[St] | Single switch with electric drive radius 190 to 300 m maintenance, inspection, functional check and general details acc. to DS 892.03 Appendix 02 Appendix 03 | | 14 | 1 WMech (Certif. acc. to 821.2005) 1 Wmech | | 2 | 2 | 2 | 2 | Single switch 1 electric drive Iso joints, track connection cables, meshing and grounding 1 peak fastening switch heating system |
| INWE 300.3.93.3.4+A1 | Switch 190 to 300 electr. (Time limit 3)[St] | Single switch with electric drive radius 190 to 300 m maintenance, inspection, functional check and general details acc. to DS 892.03 Appendix 02 Appendix 03 Tw acc. to 821.2005 | | 51.5 | 1 M tw od. 1 MA with proven 2-year testing work of measuring instrument (821.2005) 1 WMech (Certif. acc. to 821.2005) 1 Wmech | | | | 3 | 3 | Single switch 1 electric drive Iso joints, track connection cables, meshing and grounding 1 peak fastening switch heating system |

FIG. 24

| Components | TPM | TPM | Modular-ization |
|---|---|---|---|
| Focus on machines | No | Yes | Yes |
| Creation of inspection methods for the equipment | No | Yes | Yes |
| Individual determination of the maintenance strategy | No | Yes | Yes |
| Tips on the use of diagnostic methods | Yes | Yes | Yes |
| Creation of spare part management | No | General tips | Yes |
| Instructions on inclusion of sub-contractors | Yes | No | Yes |
| Tips for constructive modification | Yes | Yes | Yes |
| Instructions for redundancy formation | No | Yes | Yes |
| Tips for the speedy replacement of construction groups | Yes | Yes | Yes |
| Description of maintenance tasks | Inspection + service (not incl. repairs) | Inspection + service (not incl. repairs) | Inspection + service (not incl. repairs) |
| Tips for increased productivity | No | No | Yes |
| Determination of required time | No | No | Yes |
| Determination of implementation responsibility | Yes | Yes | Yes |
| Determination of implementation intervals | Yes | Yes | Yes |
| Employee instruction | Yes | Yes | Yes |
| Further training of employees | Yes | Yes | Yes |
| Adaptation of construction organization | No | No | yes |

FIG. 25

METHOD AND APPARATUS FOR OPTIMIZING EQUIPMENT MAINTENANCE

This application claims the benefit of provisional application Ser. No. 60/251,522, filed Dec. 7, 2000.

BACKGROUND OF THE INVENTION

1. Field of the Invention

The invention relates to a method and system for conducting maintenance and, more particularly to a method and system for conducting maintenance on machines within an area-wide operating structure.

2. Description of Related Art

In the past, maintenance concepts were focused only on production-oriented companies. Maintenance concepts were used with the goal of optimizing servicing and maintenance of machines and facilities. The most widely used concepts for management and organization maintenance are Total Productive Maintenance (TPM—used extensively in Europe and Asia) and Reliability Centered Maintenance (RCM—used in the USA). The goal of these concepts is to improve the reliability of the equipment through preventative or condition-oriented maintenance and to extend the life cycles of this equipment. With the just-in-time concepts of the 90's, the demand for maintenance in the field of process security gave new meaning to the word maintenance when dealing with the concepts of increased quality, flexibility and cost reduction.

Maintenance work has not been taken into consideration in any of the systems known up to now. Furthermore, an integrated system in which maintenance measures and strategies can be summarized has never before been developed for area-wide operating infrastructure companies, such as the Deutsche Bahn A G (the German rail operator).

Total Productive Maintenance (TPM) is a management system developed in Japan which optimizes a company's operations through combined creative input from all employees. TPM combines the concepts of Total Quality Control/Management (TQC/TQM) and Total Employee Involvement (TEI) with preventative maintenance. The main role in the installation of TPM and the activation of company optimization reserves is played by the personnel. All employees—from simple production workers and maintenance employees to management staff—are motivated towards and trained for active involvement in the company.

TPM includes the following five elements: maximization of equipment efficiency, productive maintenance throughout the entire life cycle of the equipment, the involvement of all departments in the company, input from all employees (from manager to machine operator) and motivated management of autonomous work in small teams. The three main points of TPM, which sum up the whole concept and explains the meaning of the word "total" in Total Productive Maintenance, are: 1) total (equipment) effectiveness; 2) complete maintenance system; and 3) total participation of all employees.

Reliability Centered Maintenance (RCM) is an approach for organizing and operating a tight, cost-effective, "lean and mean" maintenance program based on respective functions or use of every physical asset. RCM can be defined as an approach to maintenance that combines reactive maintenance, calendar-based maintenance, condition monitoring and proactive maintenance in order to ensure maximum capacity and availability with minimum costs for the operator. RCM links the enterprise (organization) to the facility equipment (physical assets) and the employees who operate and maintain the equipment. FIG. 1 includes a table that shows a comparison of these two systems.

It is difficult to apply these management and organization concepts to organizations with area-wide operations for several reasons. These concepts deal with infrastructure systems, such as streets and rail networks or sewage and power line systems, which have no complex machines at specific locations. The locations are subject to natural parameters. The maintenance teams work independently and have few possibilities to communication with each other. Numerous regulations and guidelines must be applied. Safety has top priority. Availability directly influences the satisfaction of the customer and lack of availability leads to low product quality. Former infrastructure, utility and local transportation companies are currently experiencing financial difficulties due to privatization.

SUMMARY OF THE INVENTION

The invention was devised to eliminate the above described disadvantages in the prior art by providing a modularized maintenance system and method which may be described as a feedback control system in which the efficiency of maintenance work is monitored and recorded and where the maintenance system is adjusted through the modification of strategies, methods and/or equipment.

The efficiency of the maintenance system can be measured based upon a comparison with the ability to achieve the following the objectives: 1) increased efficiency of production processes; 2) minimization of life cycle costs; and 3) higher maintenance productivity. If these goals are not reached or if the parameters worsen, then the modularized maintenance system and method of the invention may be activated.

For example, the following two situations may lead to activation of the invention. The first happens when the maintenance objectives are redefined. This happens quite often in a modern company. The system of the invention receives data even if the maintenance standards are not reduced. The second occurs when the fulfillment of the maintenance goals is negatively affected by the influence of various failure factors. These factors may include: installation of new equipment, modification measures such as the rebuilding or worn or failed equipment, varying stress/strain factors and increasing age of equipment. In order to compensate for such failure factors—which in many cases can neither be localized nor predicted—and to prevent any negative influences, these failures could have target variables. To ensure process stability and/or to realize new goals, numerous measures may be taken for regulating modularized maintenance and to keep it in optimal functioning status.

Regulation measures may include four building blocks: 1) equipment analysis; 2) equipment improvement; 3) strategy adjustment; and 4) modularization. These measures are closely related and effectively lead to efficient modularized maintenance when employed together.

A maintenance module may be defined as the sum of all process elements which provide complete maintenance performance. Modules may be defined according to specific criteria such as: the repeat character of summarized activities; to be summarized activities all belong to a customer's, plant operator's requested maintenance performance (for example, renewal of a drive shaft of a blanking press); objects to be maintained; type of maintenance task; regular occurring activities, thus inspection and service, the respective period after this activity will be repeated; complexity and duration of the maintenance activities; number of required maintenance staff; maintenance staff requirements (untrained service personnel, technician, foremen, engineers and the like); and general conditions of the maintenance measures.

These and other features and advantages of this invention are described in or will be apparent from the following detailed description of preferred embodiments with reference to the accompanying drawings.

BRIEF DESCRIPTION OF THE DRAWINGS

FIG. 1 is a table which details the components of conventional maintenance concepts;

FIG. 10 is an exemplary FMEA data sheet in accordance with an exemplary embodiment of the invention;

FIG. 11 shows the results of a RPN calculations for a case example in accordance with an exemplary embodiment of the invention;

FIG. 16 shows the results of a case example of measure concept preparation in accordance with an exemplary embodiment of the invention;

FIG. 20 is a graph illustrating the ideal maintenance degree in accordance with an exemplary embodiment of the invention;

FIG. 23 is an exemplary audit sheet in accordance with an exemplary embodiment of the invention;

FIG. 24 is a table illustrating the construction design of a case example in accordance with an exemplary embodiment of the invention; and FIG. 25 is a table comparing conventional maintenance systems with an exemplary embodiment of the invention.

DETAILED DESCRIPTION OF THE INVENTION

Figure 2:
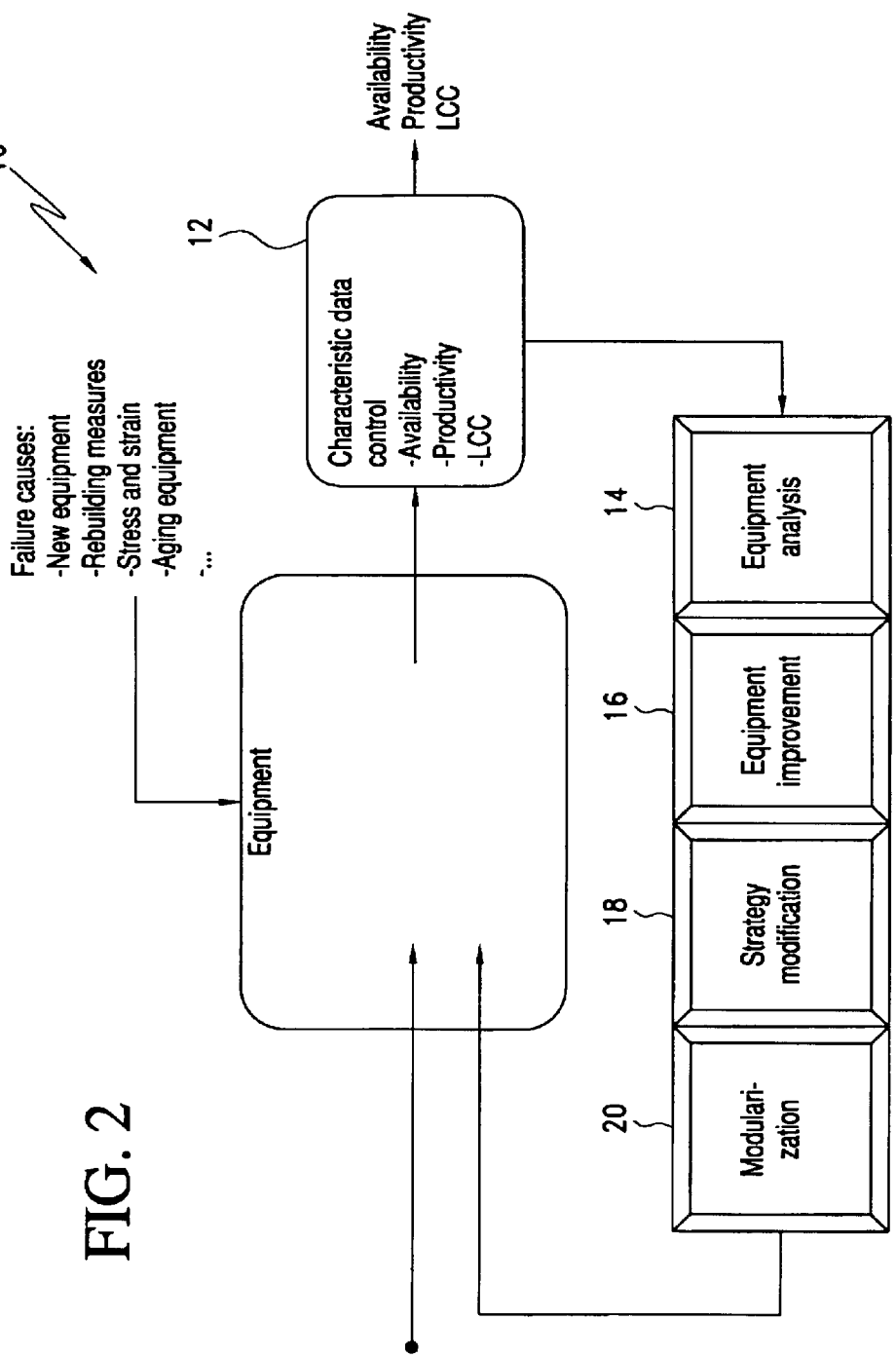
FIG. 2 is a schematic diagram of a feedback control system in accordance with an exemplary embodiment of the modular maintenance method and system of the invention.
Figure 3:
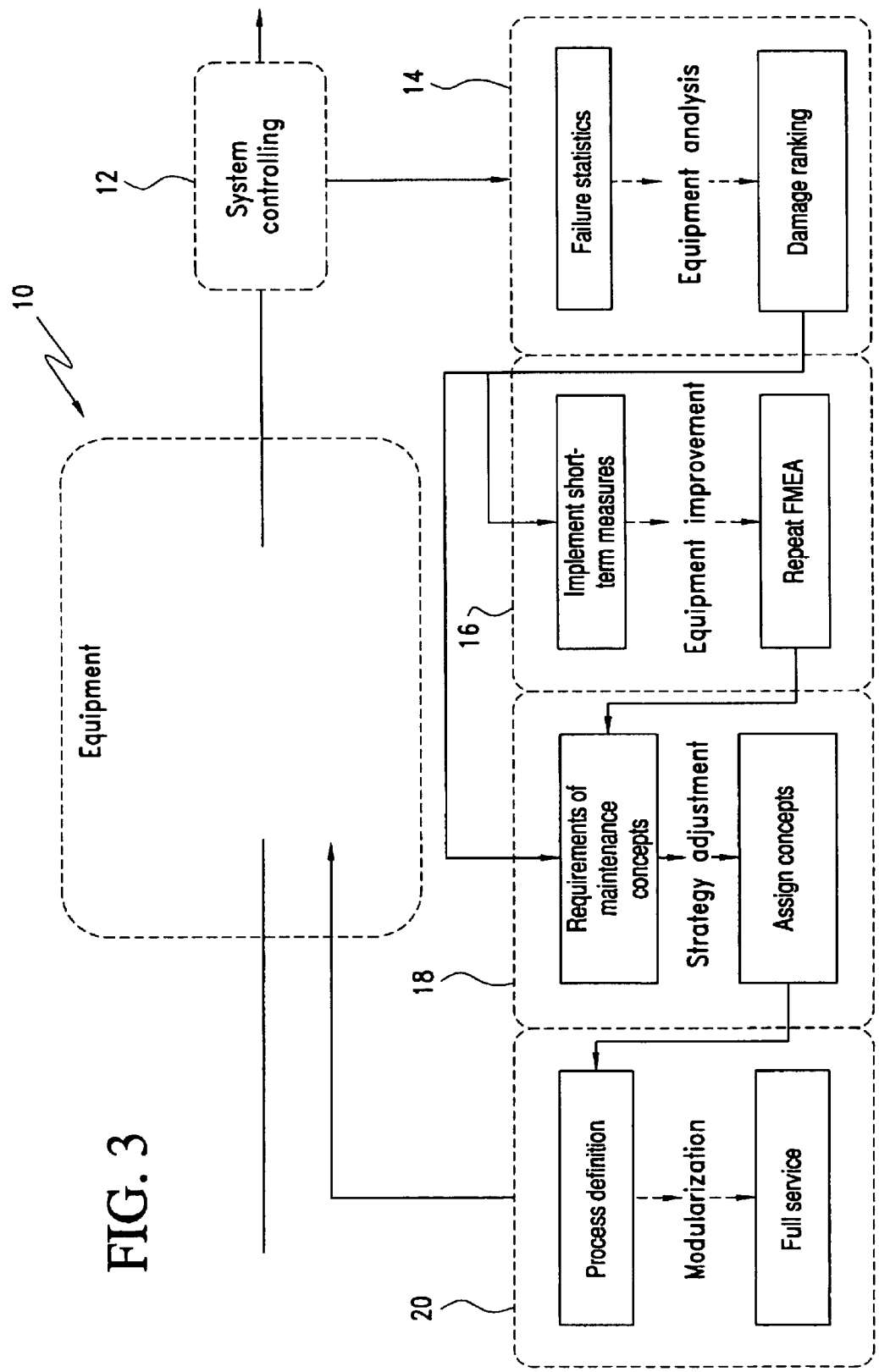
FIG. 3 is another version of the diagram of FIG. 2.

As explained above and as shown in FIG. 2, an exemplary modularized maintenance method and system 10, as also shown in FIG. 3, may be described as a feedback control system with a multi-setting control mechanism. Regulation measures may include four building blocks: 1) equipment analysis 14; 2) equipment improvement 16; 3) strategy adjustment 18; and 4) modularization 20. The feedback control system reacts when maintenance standards deviate from predetermined objectives as determined by the equipment controlling system 12. Then a systematic analysis of the situation is performed and the causes for the deviation are identified. Based on the results of that analysis, a double strategy is followed. For one, the maintenance strategy and the maintenance methods are modified in order to achieve improvements. For another, the process of equipment optimization is initiated.

During equipment analysis 14, experts and maintenance technicians work together to find solutions for maintaining system functionality and for preventing functional failures. Measures are developed for short-term solutions or corrective measures that can be easily implemented, and also solutions that entail rebuilding of worn/failed facility equipment, which can usually only be realized through the installation of new equipment.

The aim of equipment analysis 14 is to break down complex failure-prone equipment into individual components, identify the cause and extent of the failure and make the equipment and component functions more transparent. This analysis is used to introduce corrective measures which are oriented to the varying priorities of a company's facilities and the potential damage to this equipment and/or its components.

Figure 4:
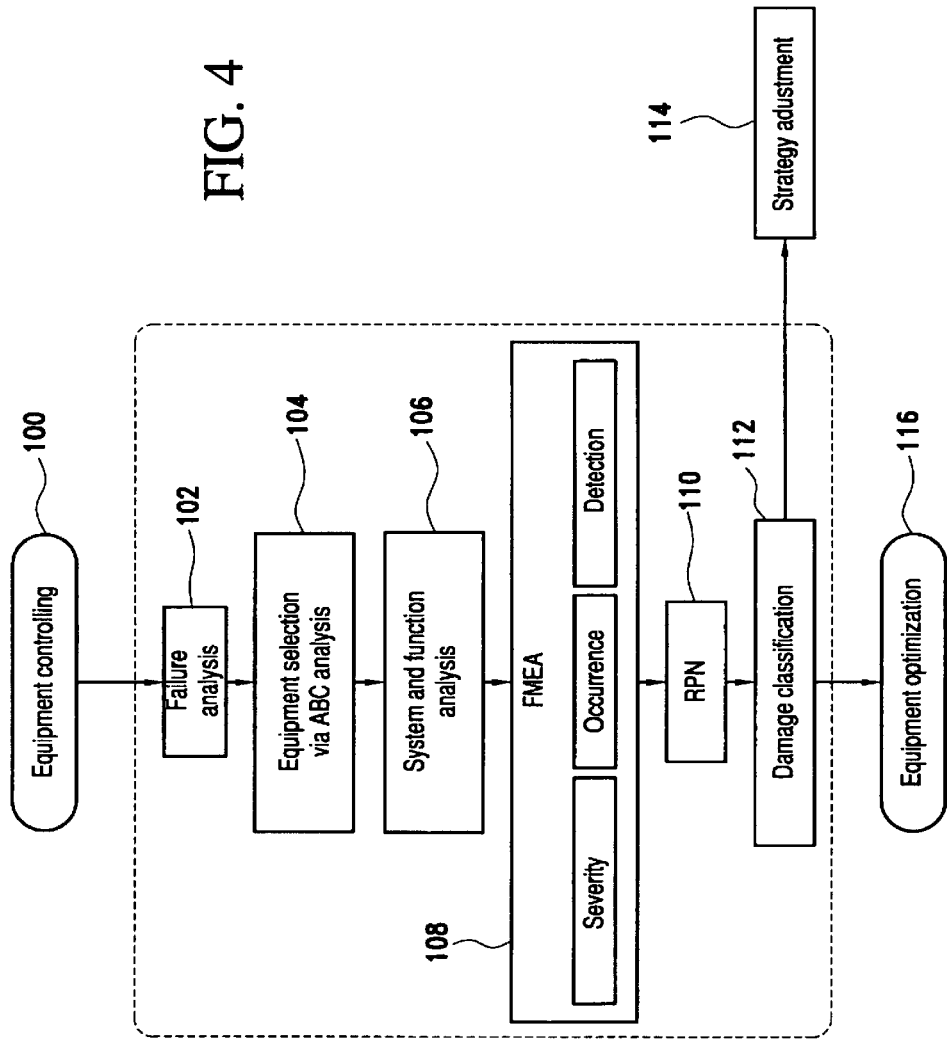
FIG. 4 is a flow chart outlining an equipment analysis procedure in accordance with an exemplary embodiment of the invention.

An outline of an exemplary procedure for equipment analysis 14 is shown in the flow chart of FIG. 4. The procedure starts at step 100 and continues to step 102 where a systematic analysis of failure modes is performed for all types of equipment. The results of this analysis provide the basis for further inspection checks and improvement measures. The procedure then continues on to step 104 where equipment is selected according to an ABC (Pareto) analysis. The process then proceeds to step 106 where the selected equipment is broken down into individual elements and a function analysis is performed and the process continues to step 108. In step 108, a failure mode and affects analysis is performed and the process continues to step 110. In step 110, the process performs a risk priority number calculation and continues to step 112. In step 112, a damage classification is performed and the process continues to step 114 and step 116. In step 116, an equipment optimization (or improvement) procedure is implemented and in step 114 a strategy adjustment procedure is performed.

In a company where equipment failures/breakdowns are only documented in a log book, these documents are inspected and processed or rated according to criteria such as frequency of failures, time required for repairs, failed components, etc. The results can be usefully input in computer programs (table calculation programs) and can be used to identify the most important failure factors and also to determine the best measures to be taken.

In the maintenance operations of larger and highly organized companies, EDP (MIS) systems are often used to outline the business processes of the company, in such systems, all failures are recorded, together with detailed information on the location, cause, duration, etc. of the failure, and the data is saved for future evaluation. In such cases, a precisely formulated data search can produce information regarding important failures with the click of a mouse.

Failures occurring within the facilities of a company may be analyzed (step 102) according to the following criteria: 1) the type and/or class of equipment (such as electricity generating equipment, air compressors, forging presses, etc.); 2) the reason for failure (e.g., bearing damage, power failure, broken shaft, etc.); 3) failure-prone components and parts in these systems (e.g., equipment motor type 4711 from manufacturer XY); 4) results and/or consequences of the failure (e.g., production down time, quality reduction, etc.); 5) failure factors related to time and location (e.g., production line no. 1, outdoor equipment, particularly winter-related failures, etc.) and the like. Failure analyses like these should be very thorough because failure statistics generally only give limited information about the actual cause of a failure and are, therefore, oftentimes the weak area within a maintenance system.

Figure 5:
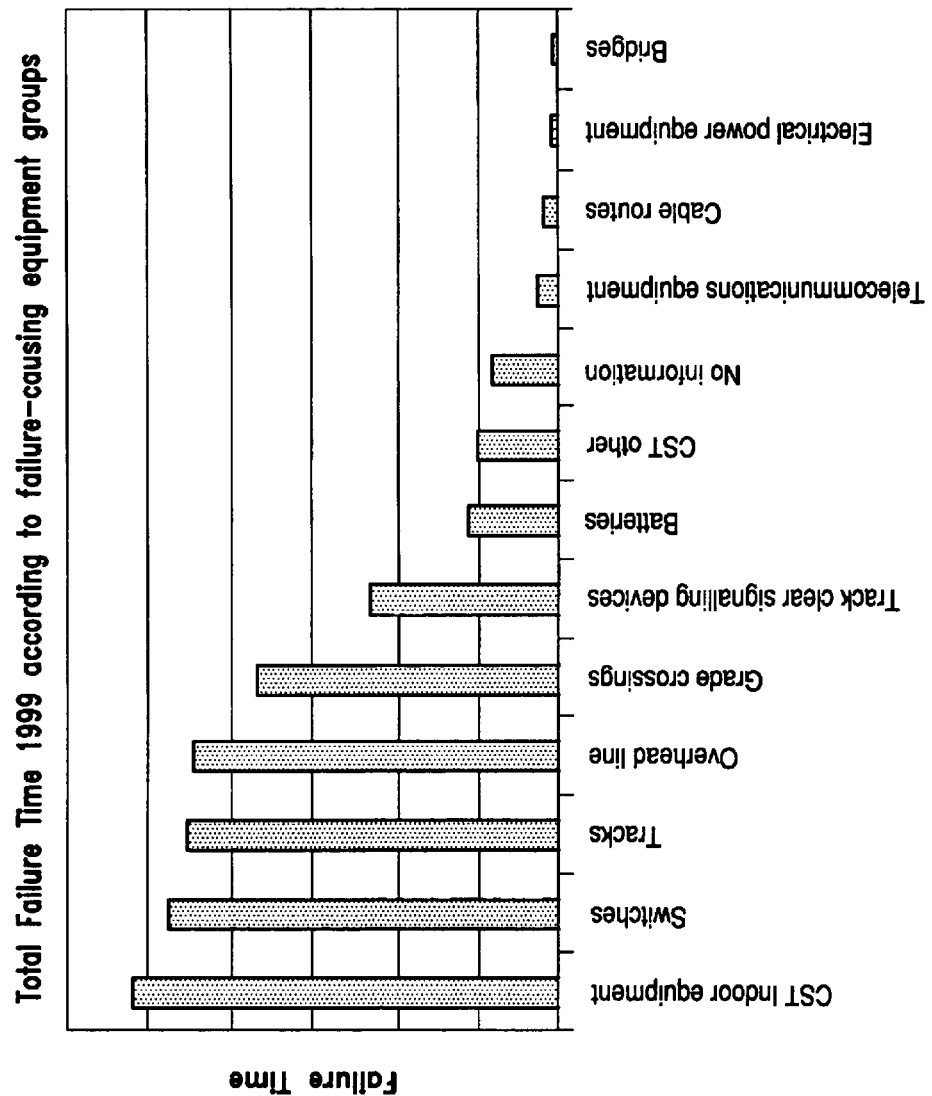
FIG. 5 shows a graph illustrating the results of a failure analysis in accordance with an exemplary embodiment of the invention.

As a case example, a failure analysis on a specific system is detailed here for purposes of illustration. Through a systematic retrieval from a PRINZIP database (a software program of Deutche Bahn A G for illustrating maintenance processes), the failure-prone equipment is identified and ranked according to the following criteria: the duration of past failure occurrences. An analysis was performed to assess all failures which occurred in 1999 and to determine the types of equipment having those failures. The results are shown in FIG. 5.

The ABC analysis (step 104 in FIG. 4) may be used in connection with the failure analysis (step 102) to identify the most urgent areas for inspection. Based on the 80/20 rule (only the equipment which causes 80% of all failures is taken into consideration), a list of priorities is established in order to prevent further trouble shooting from becoming too extensive, and to differentiate "important" failures from "unimportant" failures.

Figure 6:
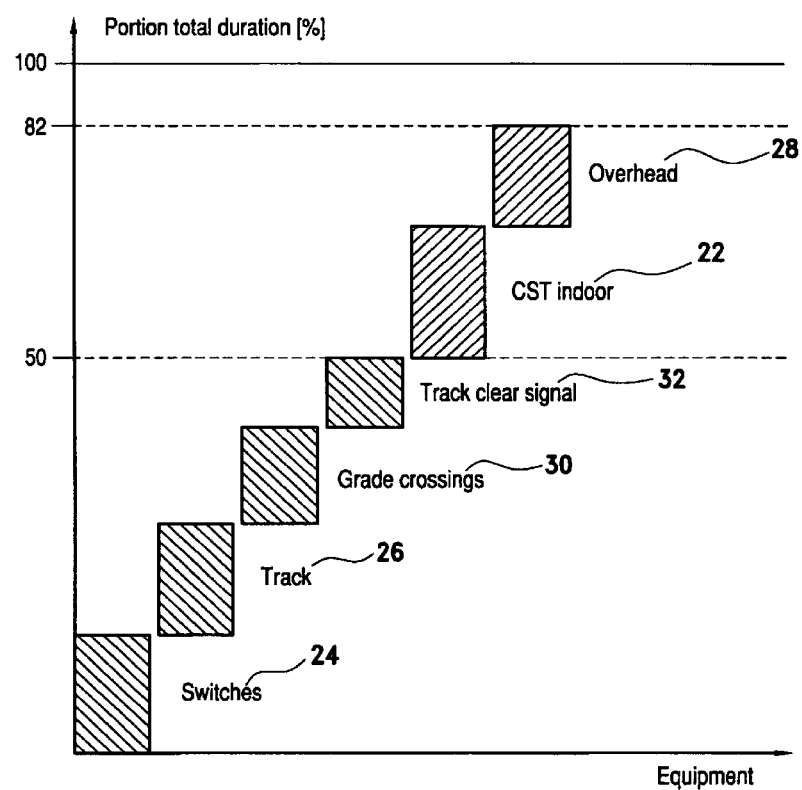
FIG. 6 is a graph illustrating the results of an ABC analysis in accordance with an exemplary embodiment of the invention.

Based upon the results of the practical example of the failure analysis for 1999, as shown in FIG. 6, the following group of equipment caused around 80% of the down time: CST indoor equipment 22, switches 24, tracks 26, overhead lines 28, grade crossings 30 and track clear signaling devices 32. This equipment was selected for further inspection/tests.

Figure 7:
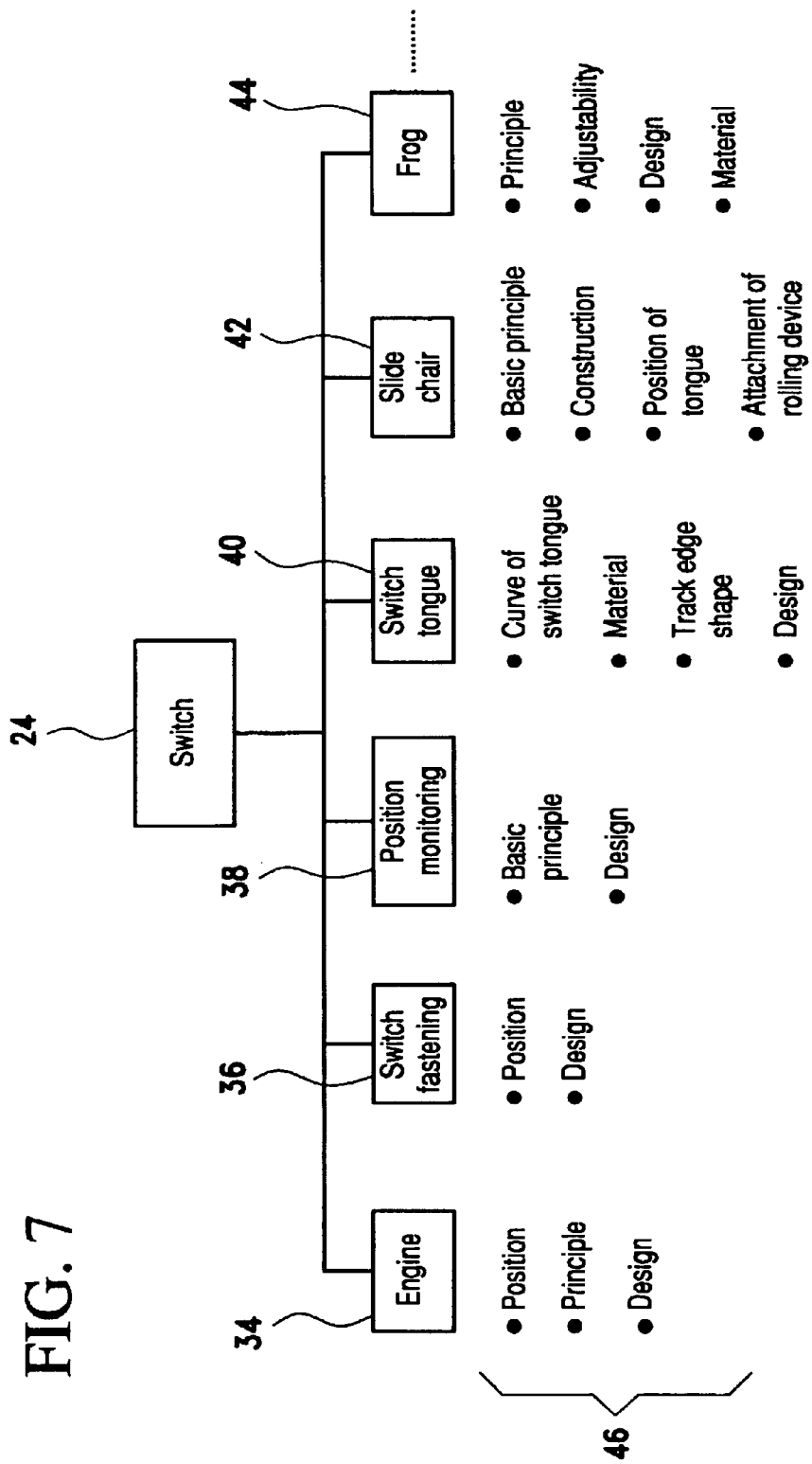
FIG. 7 is a schematic diagram illustrating the results of a system and function analysis of a case example of a switch in accordance with an exemplary embodiment of the invention.

In the system analysis step (step 106), the entire system (equipment) is broken down into its individual elements (components), with the aim of obtaining a clear representation of the equipment in the form of a block diagram which outlines the system structure. A function analysis is also performed to make the various individual functions of the entire system more transparent in order to gain a better understanding of the function of the equipment. Using the results of the function analysis, the components which are responsible for a failure/break down may be identified. FIG. 7 shows the results of the system and function analysis (step 106) performed on a switch of the case example. The switch 24 is broken down into its component parts such as, for example, an engine 34, switch fastening 36, position monitoring 38, switch tongue 40, slide chair 42, frog 44 and the like. The individual components are analyzed for their individual functions 46 as listed below each corresponding component shown in FIG. 7.

Figure 8:
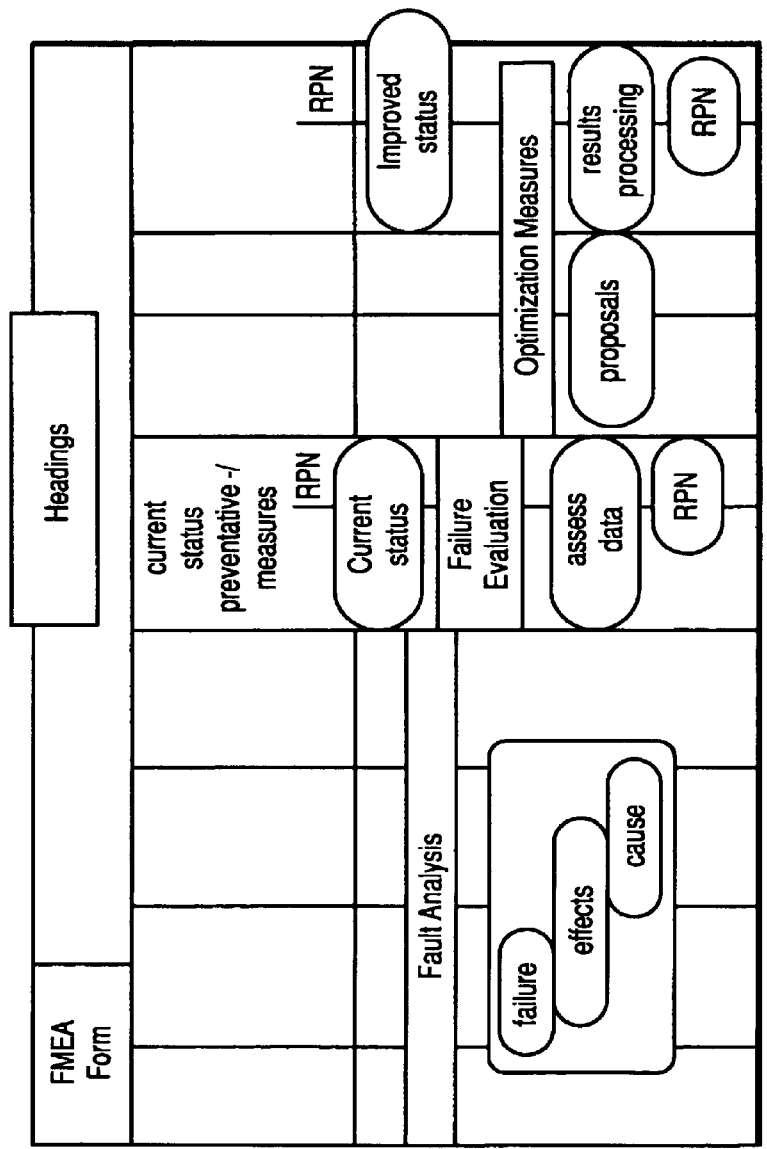
FIG. 8 shows an exemplary form for performing an FMEA analysis in accordance with an exemplary embodiment of the invention.

Failure Mode and Effects Analysis (FMEA, step 108 in FIG. 4) is a proven instrument for preventative quality assurance and failure elimination. In an exemplary embodiment of this invention, FMEA is adjusted to the requirements of maintenance specifications and is used to assess potential damage (in the field of maintenance one speaks of "damage" and not "failure," as opposed to the more production-oriented FMEA) and identify the causes for this damage (e.g., wear and tear, inefficient maintenance methods, etc) to evaluate all preventative measures that have been taken (e.g., inspections) in terms of their capacity for predicting and preventing damage and to prepare systematic corrective measures. Teams of experts may evaluate all possible failures, their potential causes and the effects of the failures using forms such as shown in FIG. 8.

Figure 9:
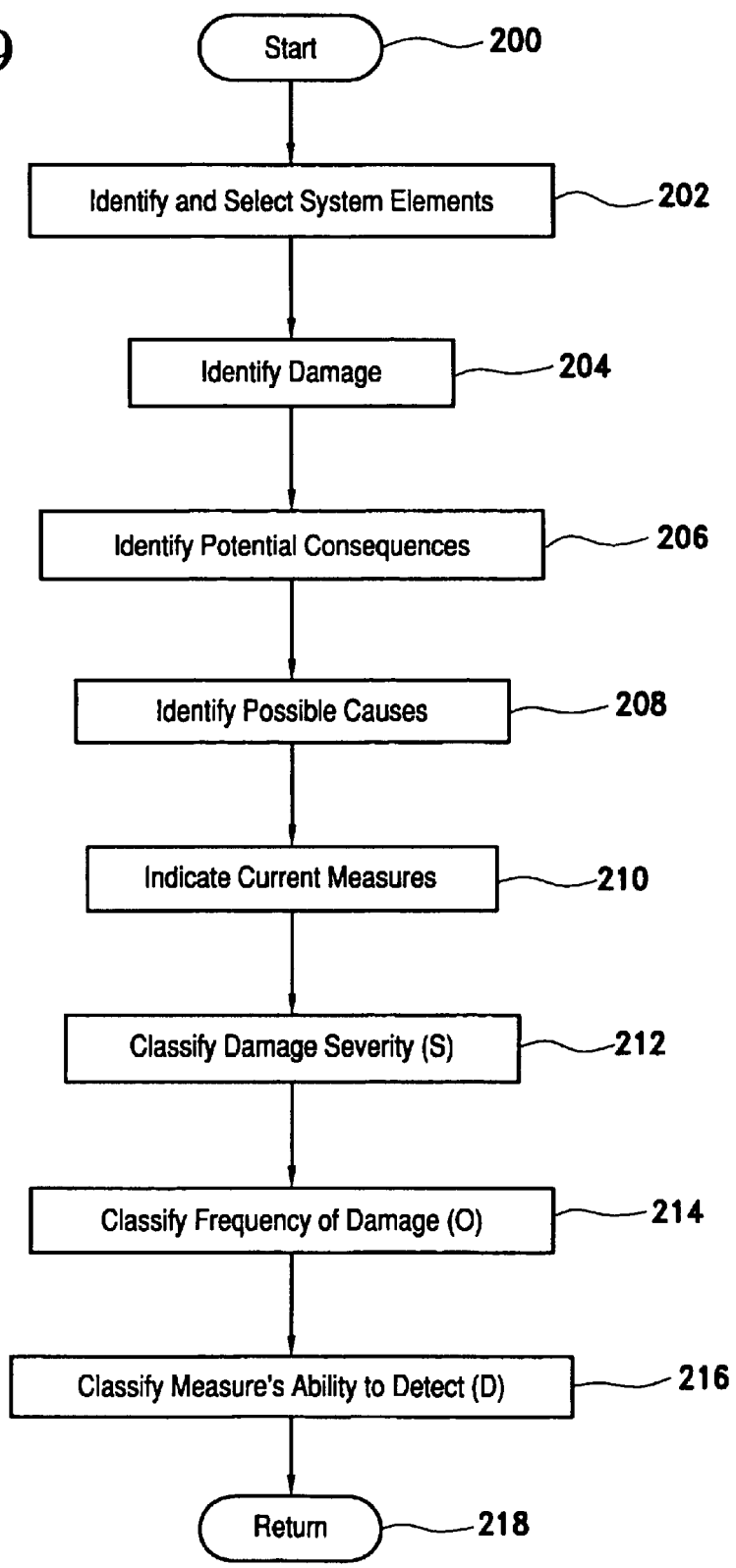
FIG. 9 outlines an exemplary control routine for implementing a modified FMEA analysis in accordance with an exemplary embodiment of the invention.

In an exemplary embodiment of the invention, there are at least three criteria for the development of a maintenance strategy: 1) the potential results of a damage; 2) the predictability of a damage; and 3) the degree of probability of a damage. FIG. 9 outlines an exemplary control routine for implementing a FMEA that has been modified in accordance with the invention. The team of experts start at step 200 and continues to step 202. In step 202, the team identifies and selects which system elements are to be examined. The team then continues to step 204 where the damage to be analyzed is identified and continues to step 206. In step 206, the team indicates the potential consequences of the identified damage and continues to step 208. In step 208, the team indicates the possible causes of the identified damage and continues to step 210. In step 210, the team indicates the current preventative and testing measures. Then, the team continues to step 212 where the consequences of the damage are classified according to the severity (S) of the damage and continues to step 214. In step 214, the team classifies the causes of the damage according to the frequency of occurrence (O) and continues to step 216. In step 216, the team classifies the preventative and testing measures according to their ability to detect (D) and continues to step 218 where the team returns to the procedure outlined in FIG. 4.

Individually, for each case and each company, the criteria of potential damage results may be further divided into: economic consequences of a damage; potential consequences for human beings and the environment; consequences on the availability of production capacity and delivery ability; and consequences that affect other plant parts (possible chain reaction). The predictability of a damage may be determined by different technical factors. They may strongly depend on technical and physical preconditions and should be determined for each case. Examples include: mechanical drive and its progress function; aging of capacitors, batteries and the like; changing of chemical and physical behaviors of lubricants; vibrations of bearings and gears and the like. In a corresponding examination the kind of wear damage should be determined to realize what extent a damage may be predicted. The probability of damage may be determined either from a plant's history or taken from the bath-tab life curve provided by equipment manufacturers.

In addition to the classification of the causes and effects of the damage, the preventative and corrective measures are also classified by the team using an evaluation formula which contains a scale of evaluation classifications. The evaluation formula and/or evaluation criteria should be adjusted to each system that is being analyzed.

In the case example, FMEA was performed on a switch. In expert workshops, potential switch damage was determined with the help of the failure analysis and the years of practical experience. The causes and results of this damage and the inspection measures to be taken were first analyzed using a flip chart in a group discussion and then classified with an evaluation key under either Severity, Occurrence or Detection. The results were then entered into prepared FMEA data sheets, an example of which is shown in FIG. 10.

As shown in FIG. 4, in step 110, the risk priority number specific to each relevant cause of failure is calculated by multiplying the evaluated criteria "severity," "occurrence," and "detection" using the following equation:

$$RPN = \text{Severity }(S) \times \text{Occurrence }(O) \times \text{Detection }(D) \qquad \text{Eq. 1}$$

Using the risk priority number (RPN), it is possible to organize analyzed damage into a certain order and indicate the priorities and necessity for corrective action. For the calculations, the results with the highest RPN evaluation should be used.

For the case example, for every damage cause discussed by the team of experts, a risk priority number was calculated by multiplying the above mentioned criteria in accordance with Eq. 1. FIG. 11 shows the results for a specific damage of "passage groove too small." For all damage causes with an RPN 200, a project was initiated to find measures for improvement.

Figure 12:
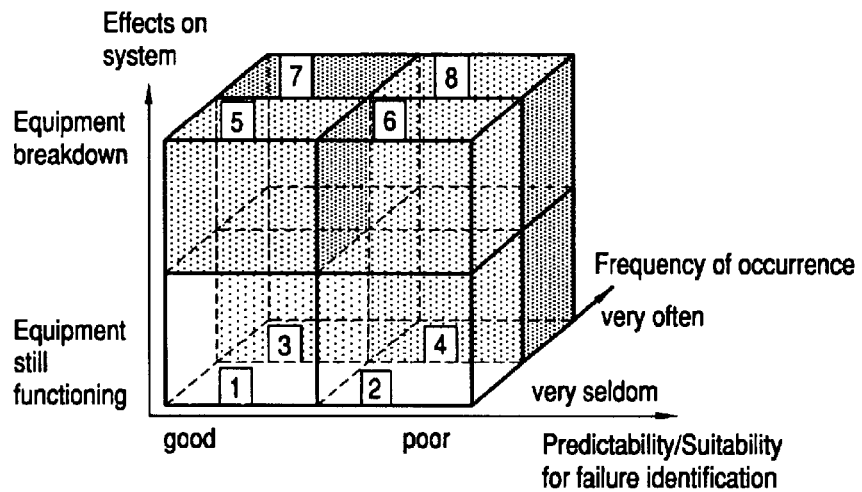
FIG. 12 is a schematic representation of an exemplary three-dimensional damage classification system in accordance with an exemplary embodiment of the invention.

The damage classification (step 112 in FIG. 4), in accordance with an exemplary embodiment of the invention, is similar to a portfolio analysis. The classification three-dimensionally connects the evaluation criteria from the FMEA ("severity," "occurrence" and "detection"), so that the causes of failure can be ranked in one of a total of eight different damage classifications. FIG. 12 shows a schematic representation of the exemplary three-dimensional damage classification system.

A team of experts may then rank the damage on a scale (e.g., from 1–10) to make it possible to define different maintenance strategies and improvement measures for the various damage classifications which can then be allocated to the classified causes of damage in an initial (rough) step. Such a rough definition of measures for damage ranking could appear as follows:

Damage Classes 1 and 2: Failure-specific maintenance;

Damage Classes 3 and 4: Calendar-based maintenance, if feasible: technical alterations;

Damage Class 5: Condition monitoring maintenance;

Damage Class 6: Calendar-based maintenance; equipment redundancy;

Damage Class 7: Replacement of failure-prone components, if financially viable: regular component exchange; and Damage Class 8: Replacement of failure-prone components, implementation of technical modifications.

This method and system of damage classification is especially good for supporting decision-making processes for prioritizing various maintenance strategies, which become more significant as the degree of damage increases.

Figure 13:
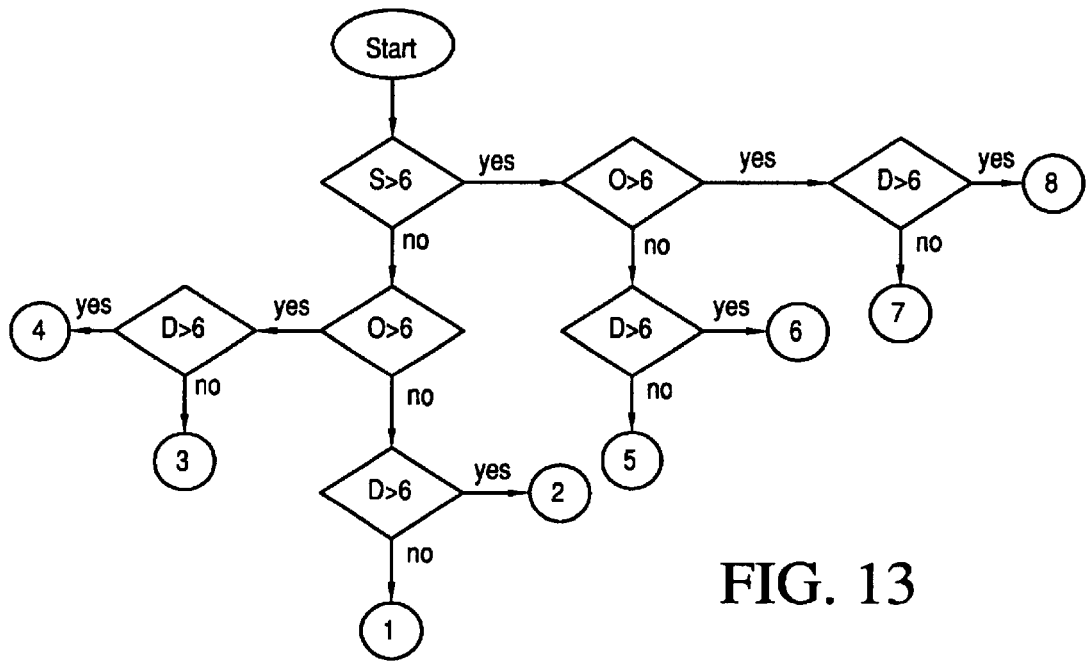
FIG. 13 is an exemplary flow chart for classifying damage based upon FMEA results in accordance with an exemplary embodiment of the invention.

FIG. 13 illustrates an exemplary flow chart for classifying damage based on FMEA results (step 108 in FIG. 4). Classification 6 has proven, on all three FMEA criteria, to a be a guiding factor in ranking the failure causes in the damage classification.

Figure 14:
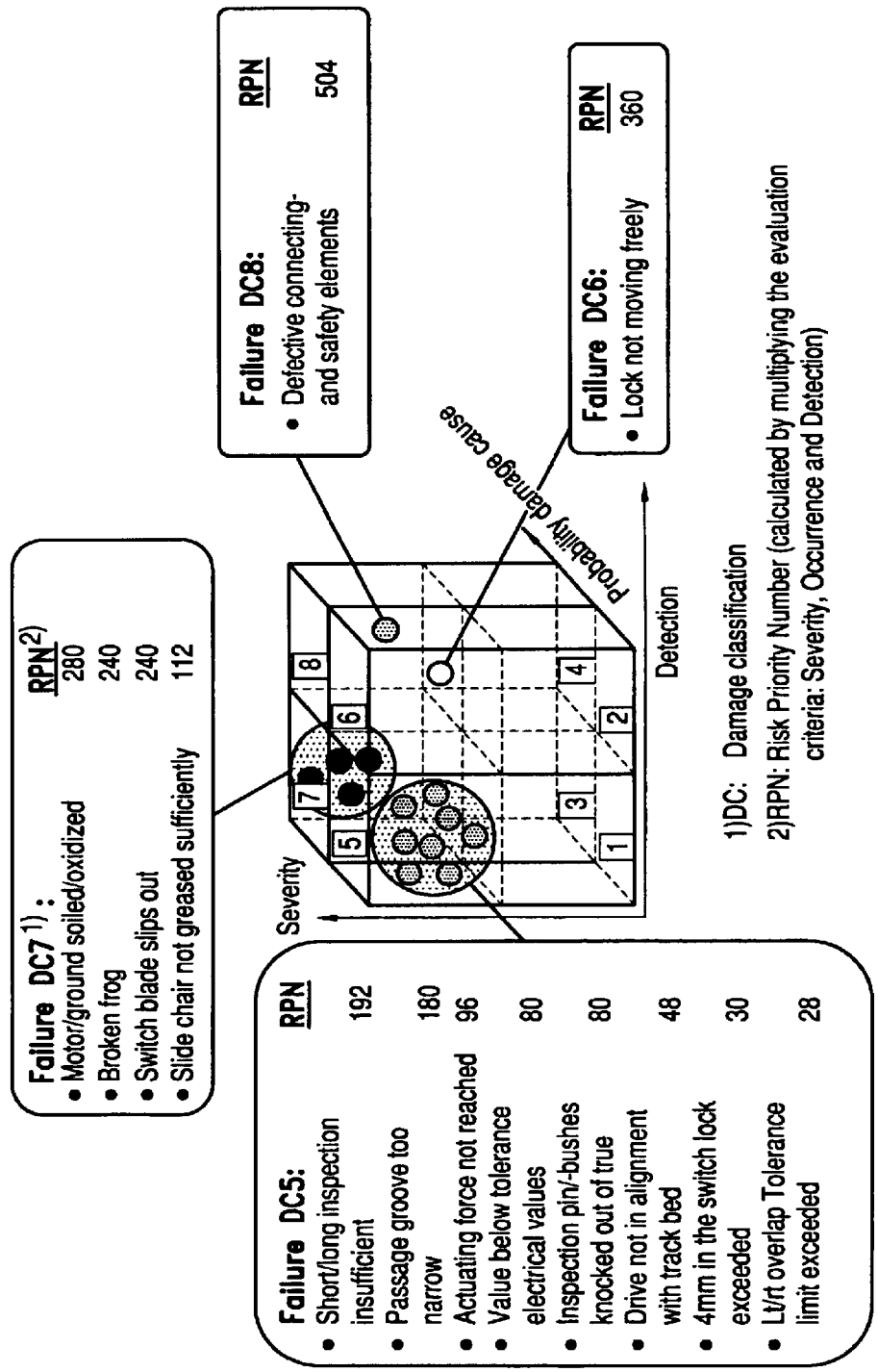
FIG. 14 is a schematic representation of damage classification on a case example in accordance with an exemplary embodiment of the invention.

FIG. 14 illustrates the results of the damage classification performed on switches of the case example. The cause specific RPN value for every damage occurrence analyzed by the team of experts was recorded and the failure was allocated to the appropriate damage classification.

Figure 15:
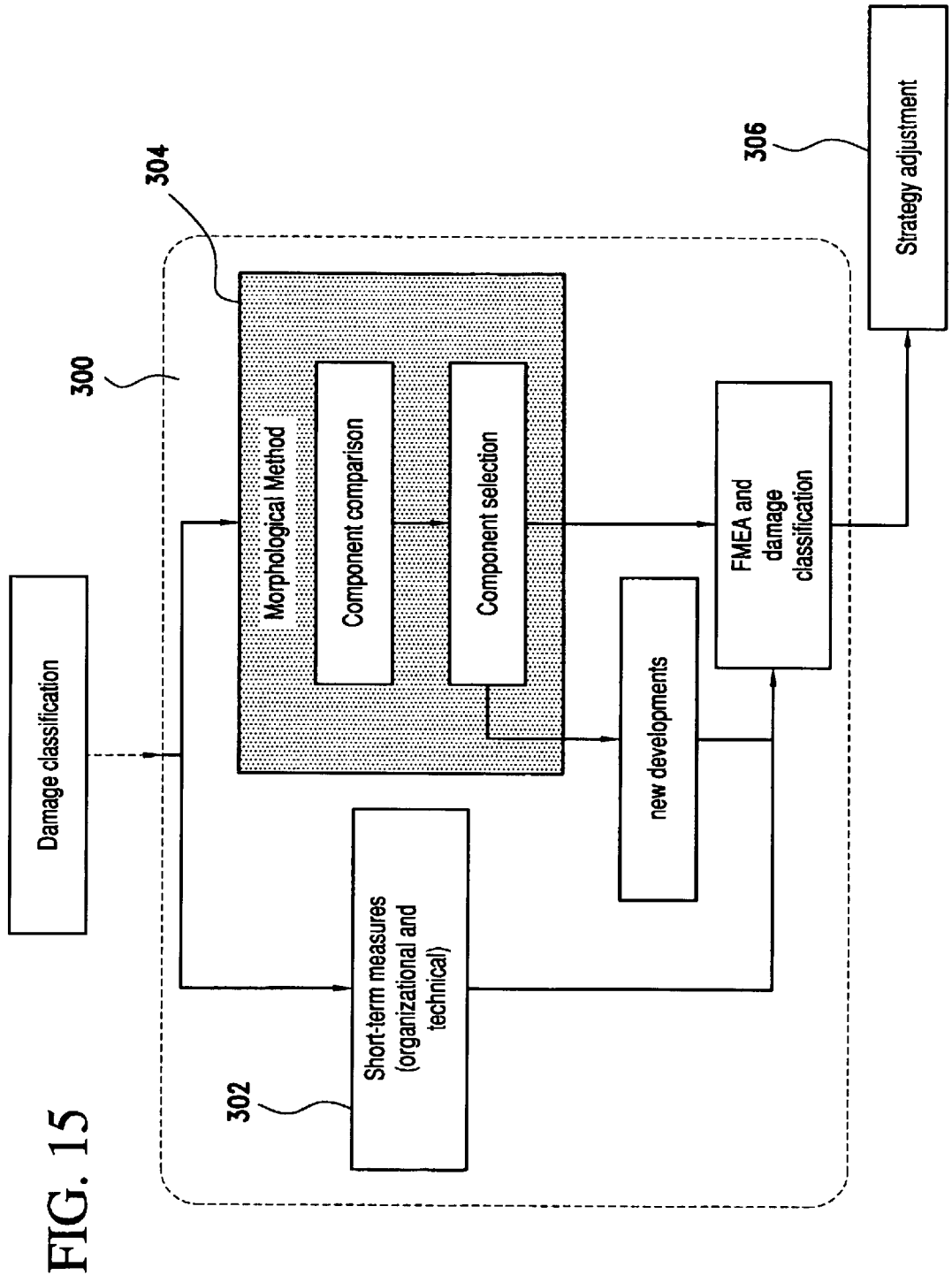
FIG. 15 is a schematic diagram of equipment improvement measures in accordance with an exemplary embodiment of the invention.

A goal of equipment improvement (optimization, step 116 in FIG. 4) is to use well-aimed and precisely-defined measures to improve all of the equipment and/or components that the analysis has indicated as being prone to failure and, therefore, in need of optimization. As shown in FIG. 15, the measures taken for equipment improvement 300 are divided into two different types of procedures. The first procedure is a definition and implementation of fault-specific and equipment-specific short-term measures for existing facilities 302. The second procedure involves constructive rebuilding or installation of new equipment with the support of the morphological method 304.

The definition and implementation of fault- and equipment-oriented short-term measures 302 includes organization measures or simple technical modifications which can be implemented on existing facilities. For example, organization measures may include staff training courses, introduction of rules to keep service manuals near the equipment, improved procedures for inspection of new equipment and equipment for repairs and the like. Technical modifications may include, for example, the use of dust covers in dust-prone operations areas, exchanging parts for improved designs (e.g. tracks of harder steel) and the like.

In step 302, based upon the results of the FMEA, teams of experts prepare concepts for measures to be implemented in the short term for failure-prone components. These proposals are formulated in a detailed plan of measures which include implementation phases, timing, spheres of responsibility and feasibility. FIG. 16 shows the results of the step performed on the case example.

After the measures have been assessed in terms of technical and financial feasibility in step 302, the timing for realization of the partial implementation must be set down and supervised by the FMEA team. To measure the effects of the equipment improvement measures, the FMEA and damage classification should be repeated after implementing the measures. If the results of the analysis are satisfactory, the equipment-specific maintenance strategies are adjusted accordingly in step 306. If the new RPN values do not meet the desired level, further expert analysis may be performed by a team of experts and suitable measures are introduced.

If the FMEA reveals a complex damage situation, before new equipment is installed, the design should be optimized or, if necessary, completely reconsidered and further equipment modifications introduced.

Figure 17:
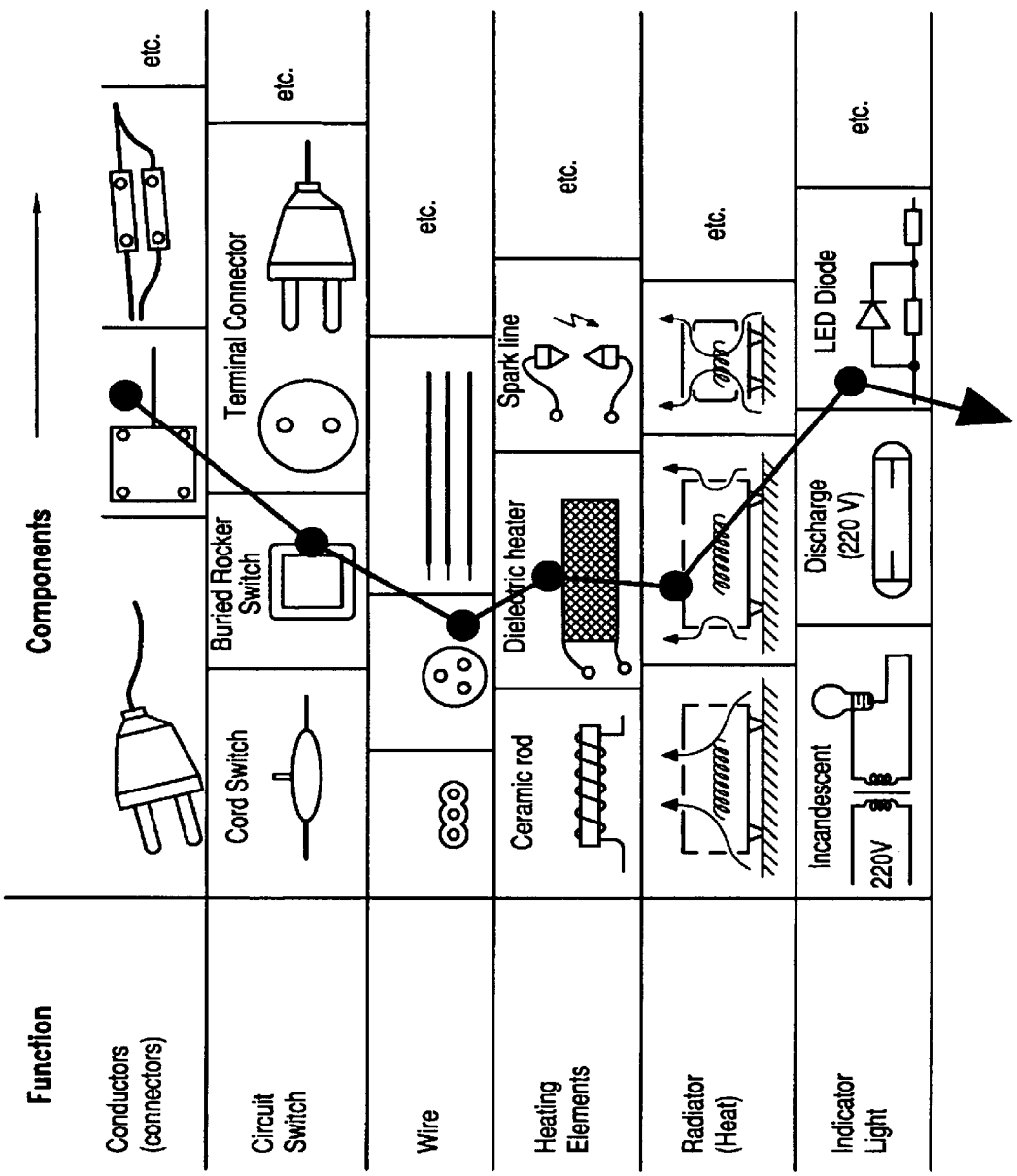
FIG. 17 is a schematic diagram of the morphological method applied to a case example in accordance with an exemplary embodiment of the invention.

Configuration of new equipment may be performed using the morphological method of step 304. The morphological method is an effective tool for maintaining improved functionality of machines or other equipment. With the help of the morphological method, known solutions for equipment functions are compared and evaluated using defined criteria. Through the combination of relevant maintenance best practices, the ideal equipment configurations are then determined. However, care should be taken to ensure that the components which are selected can be used in combination with one another. The principal of the morphological method is illustrated with the case example shown in FIG. 17.

Figure 18:
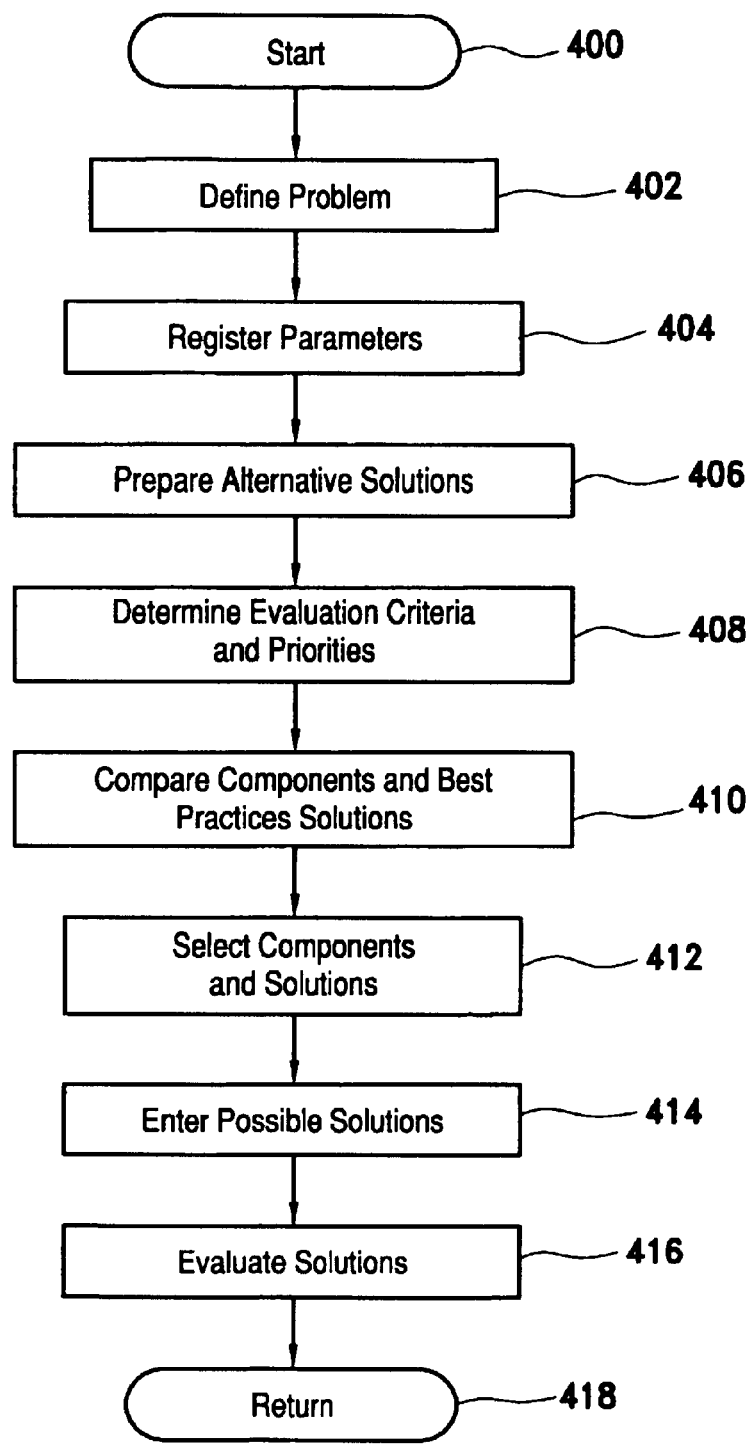
FIG. 18 is a flowchart outlining a routine for performing the morphological method in accordance with an exemplary embodiment of the invention.
Figure 19:
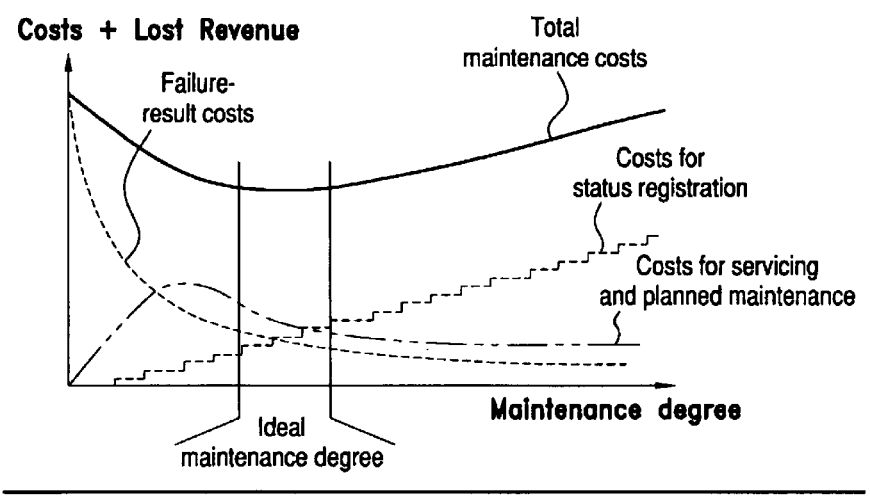
FIG. 19 is a table of the results of the application of the morphological method to a case example in accordance with an exemplary embodiment of the invention.

The process for performing the morphological method is outlined in the flowchart of FIG. 18. The procedure starts at step 400 and continues to step 402 where the experts define the problem. The problem may be defined using several criteria, such as, for example, efficiency, reliability, availability, plant safety and plant productivity. The procedure continues to step 404 where the team registers the influencing parameters and continues to step 406. Parameters to be collected may include efficiency (repair costs, dead time costs), reliability (damage frequency), availability (meantime between repair and meantime to repair), plant safety (probability and effects of possible accidents) and plant productivity (output and process security). In step 406, the team prepares alternative solutions for the equipment functions and continues to step 408. In step 408, the team determines the evaluation criteria and their priorities and continues to step 410. Priorities may be determine using the following criteria: potential result of damages, probability of damage, suitability of current maintenance measures to avoid damage, the evaluation of the three criteria are then multiplied and the higher the product the higher the priority and the necessity to find an alternative solution. In step 410, the team compares components and best practices solutions and continues to step 412. The suitability of new solutions may be measured according to the same criteria set forth above in relation to determining priorities. In step 412, the team selects components and combinations of suitable solutions for entire systems and continues to step 414. In step 414, the team enters the possible solutions and continues to step 416. In step 416, the team performs a final evaluation of the solutions. For process analysis, the following criteria may be used: content and number of the process element; total duration and duration of each process element; type of process elements (such as superfluous, preparation and follow up, e.g., providing tools, seeing user guide and the like, primary maintenance tasks, e.g., removing and installing a coupling, and secondary maintenance tasks such as removing a protective cover to get to the maintenance object), level of efficiency of the maintenance activities (working efficiency), number of required workers, required qualifications for the individual tasks and required tools. FIG. 19 shows the application of the morphological method to the case example of a switch.

If the desired improvements cannot be achieved with the existing equipment components, the equipment must be modified. In order to do this, the specifications for the modifications should be discussed in collaboration with the manufacturer of the equipment/equipment component and recorded in a performance manual. In order to measure the equipment improvement, the FMEA may be repeated. If the results of the analysis are satisfactory, the equipment-specific maintenance strategies can be adjusted accordingly. If the new RPN values do no meet the desired level, further analysis may be carried out by teams of experts and suitable measures introduced.

Figure 21:
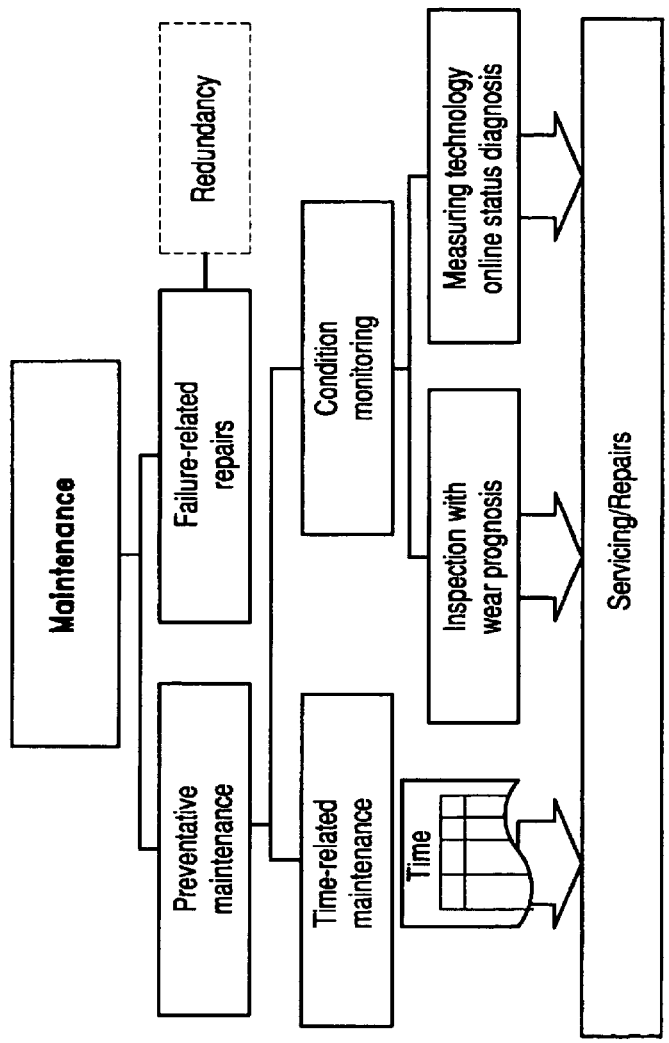
FIG. 21 is a schematic diagram of exemplary maintenance concepts in accordance with an exemplary embodiment of the invention.

Based on the results of the FMEA and damage classification, all equipment components are allocated maintenance concepts that are best suited to them. Depending on the individual damage classifications, these concepts follow certain maintenance strategies, e.g., condition-oriented or failure-oriented maintenance. These concepts are to ensure the highest level of equipment availability and safety standards with the lowest possible costs. As shown in FIG. 20, the ideal maintenance degree is the one with the lowest overall cost for maintenance, such as, for example, the total costs incurred by failures/damage, for servicing and planned maintenance work and for status registration. A low maintenance degree includes, for example, a failure-oriented maintenance while a high maintenance degree includes, for example, status-oriented maintenance with the help of remote diagnosis. The damage classifications identified using FMEA may serve as a basic orientation for defining the most suitable maintenance concepts. Exemplary maintenance concepts available to a maintenance technician are show in FIG. 21.

The following case example illustrates the allocation of maintenance concepts. As a result of a consulting project it was discovered that a rail operator had very few switches that could be classified as critical equipment. These switches were characterized by the fact that they were installed in a central area of the track network and were, therefore, exposed to a high level of wear and tear and, consequently, caused a large percentage of the failures in the overall system. It was proven that the well-calculated use of remote diagnosis devices can lead to a considerably lower number of failures in such switches and that the necessity for manual inspections can be considerably reduced as well.

Prior to implementation of the remote diagnosis system, the train delay time was 50 minutes annually, the resulting cost from the train delays was 10,000 DM annually, the number of inspections per was 12 annually, the annual cost of inspection was 2200 DM and the total annual cost of maintenance was 12,000 DM. After the installation of the remote diagnosis system, the annual train delay time was reduced to 10 min, the annual cost for the train delays was 2,000 DM, only two inspections per year were now required for an annual cost of 360 DM for those inspections, which brings the total cost per year down to 2,360 DM. A cost reduction of 9,840 DM per year per switch. On an investment sum of approximately 10,000 DM per switch for the diagnosis equipment the time of repayment is approximately one year.

One goal of the modularized maintenance procedures is to summarize the work from the areas of servicing, inspection and repairs into modules which are separate units. Each module represents its own partial process and modules can also be combined to handle complete orders for maintenance work. The characteristics of the modularized maintenance modules include: the reproducibility of the modules on all equipment of similar design and in different locations; the detailed description of the modules in terms of required resources, time and tools; the combination of possibilities with other modules for achieving a wide range of full services; a high level of productivity due to less waste in the process elements and through the adoption of standardized best practices; and improved maintenance quality through the reproducibility and measurement of all services.

Figure 22:
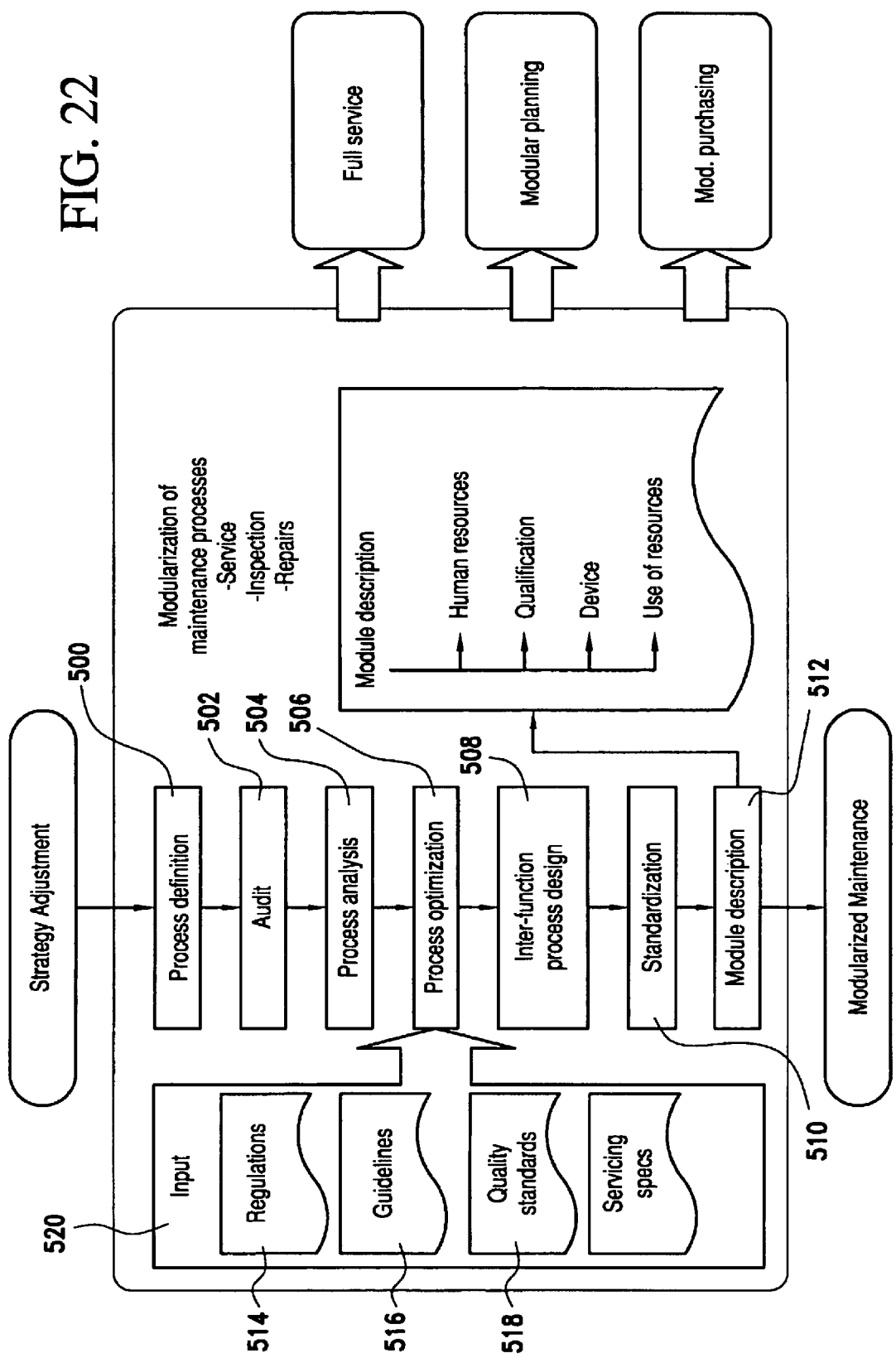
FIG. 22 is a schematic diagram of a modularization process in accordance with an exemplary embodiment of the invention.

As shown in FIG. 22, the modularization process includes the step of process definition 500, audit of the current processes 502, process analysis 504, process optimization 506, inter-function process design 508, standardization of the process elements 510 and module description 512. The basis of maintenance-related process definition is formed by the existing servicing, inspection and repair work. These tasks may be set down in the form of regulations 514, guidelines 516 and quality standards 518, which according to FIG. 22 may be input 520 for the modularization of maintenance processes. Process definition 500 may describe equipment-related servicing, inspection and repair work in such a way that clear structures are created for the follow-up inspections. Process definition 500 as applied to a case example of a switch follows. The servicing, inspection and repair of a switch was carried out by three special departments: Control and Safety Technology, Trackways and Electrotechnology. Each department is responsible for different jobs on the switch. Trackways handles the maintenance of the track bed, Control and Safety Technology is in charge of motors and control systems and their testing equipment and Electrotechnology takes care of the maintenance of the switch heater. The individual departments work according to regulations and guidelines specific to each department, so that the timing for deadlines varies depending on the level of rail traffic. Deadlines represent the time intervals at which the individual special departments must carry out their maintenance work. The deadlines for switches depend on the level of rail traffic, which is defined by the speed and weight of the trains passing through each day.

The work load of the special departments depends on the size and technical equipment of the switch. The diameter (radius) of switches can vary from 190 m to 7000 m, and the switch equipment also varies in terms of the motor, sliding system and control system. Different switches must, therefore, be evaluated individually.

Process definition is carried out with the help of expert knowledge, through interpretation of valid regulations and guidelines as well as evaluation of existing inspection and servicing instruction manuals. The process definition and its follow-up procedure for the practical example is illustrated below for the Trackways department.

Trackways checks the condition of the track bed of the switch. For this, a track bed inspection, as well as, a measurement of every necessary aspect of the switch must be performed. These measurements can be performed either manually or with measuring devices. For measurements using a switch measuring device, the following steps must be taken: 1) Load the data for each switch into the measuring device at, for example, a server at a central depot; 2) Mark the measuring points on the switch at the rail base (every third tie); 3) Measure the switch with the measuring device at the measuring points; 4) Enter the results from the track bed inspection in the hand-held computer; and 5) Save the recorded data in the server and print out the data sheets.

An audit is the observation, recording and documentation of duties, work processes and procedures and the like by experts (auditors). These auditors do not work on the processes themselves, but rather merely observe them (auditing). During audits, all maintenance work done for the defined processes is documented by a maintenance technician, with the goal of keeping a detailed account of the actual status, for example, the process time, the employee qualifications; the resources used and the job description. The data is recorded on prescribed forms (audit sheets), an example of which is shown in FIG. 23. The exactness of the time registration corresponds to the real-time for one work step. During the audit, the time progress is recorded and individual time units are formed. These individual time units are allocated to different time classifications, which may be defined as follows. A core time, in which scheduled work, necessary for the completion of the process, is carried out. Preparation and setup time for the loading of a vehicle with the necessary tools and material at the central depot. Traveling time for moving from the central depot to the work site or from one site to another. Waiting time due to trains and/or operational interruptions. Personal allowance during which work is interrupted due to personal or other circumstances. Idle time which is wasted time either through the fault of an employee or due to unfortunate circumstances.

Furthermore, the job is described as precisely as possible on the audit forms, including the exact starting and finishing times and any influencing factors and/or reference values for completion of the job, for example, 10 ties per 100 meters of track. Strengths and weaknesses, such as, for example, the use of incorrect or unsuitable tools, as well as order and cleanliness of the equipment are document in the form of photographs.

To achieve an accurate evaluation, the work steps to be audited should be performed in accordance with regulations and guidelines.

Each audit should be performed three times, if possible with different employees and at different locations, in order to obtain a representative sampling for an accurate average and to adopt maintenance best practices.

As a case example, an audit of a switch is described. The audit of a switch was performed with the involvement of three special departments. For each department, the following kinds of data registration was required: the number of employees and their qualifications; a list of tools, spare parts and other materials taken to the job site; individual observation/auditing of the employees; job definition based on the work performed; documentation of the work procedure and/or the order in which the work was done; and the progress time of the work and formation of individual time units.

For the specific example, the Trackways department produced the following result for the inspection of a switch. A two man team consisting of a supervisor/manager and one Trackways technician (of varying qualifications) carried out the inspection. The tools and measuring devices included the measuring device, standard gauge and paint markers for marking the measuring points. Two employees were accompanied by two auditors. The list of duties for the Trackways supervisor/manager included: 1) loading the switch data into the computer (job from day before); 2) marking the measuring points; 3) measuring the switch with the measuring device and enter any defects; 4) inspecting the track bed; 5) checking the distance between tongue and bearing stud; 6) entering the measurement results in the computer from the track bed inspection and the switch tongue inspection; and 7) saving the data in the server and printing out the data sheets at the central depot. The procedure for the Trackways technician is the exclusive responsibility for the safety of all persons on the tracks.

With the help of the process analysis, the process was broken down into its individual steps in order to detect weak points such as, for example, unproductive parts, excessive resource consumption and tasks requiring too much time. The process analysis on the case example of Trackways showed that the Trackways technician did not do a key job, the marking of the measuring points proved to be a time-consuming job and no manner of servicing or repair work was carried out.

Based on the results of this analysis, the process optimization step improves the quality of the processes, eliminates superfluous tasks and optimizes the combined work of various different tasks. In the case example of the switch, the process optimization of Trackways showed that the marking of the measuring points could be replaced by a more permanent marking method such as, for example, tie nails, aluminum plaques on the rail base, and the like and that preparation and follow up work can be delegated to employees in the central depot to reduce waiting time.

One goal of process design for all types of functions is to replace an existing job allocation by specialized functions and to integrate corresponding processes to avoid unproductive delays. As a case example, a team consisting of two employees from Trackways carried out the inspection of the switch track bed without doing any servicing or repair work. Control and Safety Technology also carried out their maintenance work with a two-man team. Besides the calendar-based inspection and servicing of the equipment parts, the team took care of minor repair measures. The Electrotechnology department carried out their maintenance work on the switch in a similar manner.

The inter-functional process of the switch necessitates the integration of all three special fields in one maintenance team. The team included three maintenance technicians who together have adequate qualifications for carrying out all maintenance work on the switch for all three special departments. All maintenance work can then be carried out at one time, which results in an increase in core time and through the combined efforts of the team time-limited maintenance jobs can be taken care of immediately. Furthermore, the team is to be equipped with a vehicle, to enable the team to bring along all of the measuring devices, tools and spare parts needed for minor on-the-spot repairs for all three special fields. Further benefits of the integration of the three departments includes reduced travel time due to the reduced number of trips, a reduced need for vehicles and an increase in switch availability since it is only necessary to disable it once and not for each individual special department.

Standardization of maintenance processes means that work steps and processes that have been identified as being ideal can be modified and organized to be used as models for easy transfer to other equipment. As a practical case example, the standardization of the switch was performed under consideration of the quantity structure of the Deutsche Bahn A G. The result was that from a total of 100,000 switches approximately 70,000 had similar construction design and equipment and, therefore, the procedure for maintenance processes is also similar.

The construction design of the standard switch was defined as a radius of up to 300 meters, an electric motor, a switch lock, regulating equipment, direct current, a switch heater, ground and reverse current. By comparing the deadlines from the relevant regulation manuals, a uniform timing schedule could be established for the object, and for 70% of the switches all over Germany, a module could be defined that covered the complete maintenance work on these switches.

As shown in FIG. 24, for an exemplary embodiment of the invention, the full service maintenance modules are identified by module number, module name, exact job description (module work), machines and devices needed for the task, module time per module unit, number of employees and their qualifications, deadlines and quantity structure.

Maintenance work that is handled with the modularized maintenance in accordance with the invention creates new design possibilities for the surrounding area of the maintenance work such as full service based on modules, modular purchasing and modular planning. Full service describes one of the goals of modularized maintenance. With the help of modules it is possible to handle all necessary and required maintenance processes and jobs in the facility without the customer having to issue several orders to different special fields. This means that, if there is an equipment breakdown the customer can always turn to the same supplier, who will repair the equipment with the help of an interdisciplinary team of technicians, mechanic, and the like. Unnecessary friction loss between the various functions is, therefore, a thing of the past and the maintenance service is carried out with the highest level of efficiency in the shortest possible time.

As a result of modular purchasing, it is now possible to draw up contracts for the purchase of completely modularized maintenance services rather than buying individual maintenance work as before. This can lead to major cost cuts.

With the help of maintenance modules, it is now possible to plan all future maintenance work modularly and depend upon existing modules. The ability to rely upon proven instruments simplifies the maintenance work and increases planning safety.

As shown in FIG. 25, the modularized maintenance methods and systems of the invention integrate the best features of TPM and RCM while adding the additional features of tips for increase productivity, the determination of the required time and the adaptation of the construction organization. The systems and methods of the invention use elements of lean management and best practices to develop a system of serial modules for registering and controlling company processes, which otherwise could not be as efficiently planned and monitored. Until the development of the present invention, these tasks were handled as time-consuming and cost-intensive processes and were not often set up with concrete timing schedules. The modularization methods and systems described herein provide a clear method for recording such tasks in a plan journal, thus making them calculable and possible to plan.

By clearly illustrating the work in modules, maintenance tasks (such as inspection, servicing, repairs and the like) are transformed into quite normal work processes that may be planned and calculated. Inspections, servicing and repairs that were previously not calculable, become simple to plan and calculate, so that the real-time of work hours can be controlled, particularly for infrastructure-oriented network operators like the Deutsche Bahn A G. Furthermore, the clearly defined working processes lead to qualitative improvements and reproducible results.

The methods and systems described herein are not limited to industrial companies with location-based operations, but may also be successfully used in infrastructure companies with area-wide operations. Furthermore, the invention may be transferred to all other service sectors and may be implemented for a new process-oriented working mode, for example, on a construction site. In such cases, the process-describing modules form an ideal basis for procedure monitoring.

The especially difficult step of integrating legal regulations—which dictate the requirements for maintenance in a very restricting way—into the modules is another aspect that makes the present invention unique.

The overall systems and methods described herein of self-optimizing using a feedback control system, leads to optimal use of resources for reaching cost, quality and availability objectives. The use modules makes it possible to plan, calculate and control all maintenance work, thus making it also possible for management to optimally control an area that was previously opaque.

Additionally, the optimization process initiated by the feedback control system of the invention allows the maintenance of a facility to be carried out in a process-oriented way and weak spots are systematically eliminated.

As a case example, a switch lock was optimized in accordance with one exemplary embodiment of the invention. Through the use of latched fastening, weather conditions no longer had such a major influence on maintenance work, so that the servicing cycles could be extended and such tasks as inspection checks and possible adjustments were no longer necessary. With the module for inspection and repairing of a switch, this time could be subtracted. As a result, the process was redefined and the regulations and guidelines were amended accordingly.

Systematic equipment optimization and individually-tailored maintenance strategies in accordance with an exemplary embodiment of the invention, now make it possible to optimize the availability and cost factors of maintenance work.

By systematically analyzing facility equipment, managing the components individually and allocating their damage classification in accordance with the invention, heirarchically organized requirement-oriented maintenance strategies for the individual components of the facility can be defined. This also makes it possible to undertake optimization measures in terms of quality, availability and failure reaction of the equipment in order to cut costs and restrict expenditures to include only those measures that are really necessary for achieving set objectives. Therefore, the most economical solution is achieved for every piece of equipment and its components, while guaranteeing the required availability of the equipment. The waste potential of former systems is thus eliminated.

It is, therefore, apparent that there has been provided, in accordance with the present invention, systems and methods for computer controlled display. While this invention has been described in conjunction with embodiments thereof, it is evident that many alternatives, modifications and variations be apparent to those skilled in the applicable arts. Accordingly, Applicants intend to embrace all such alternatives, modifications and variations that follow within the spirit and scope of this invention.

What is claimed is:

1. A method of optimizing equipment maintenance procedures comprising the steps of:
   analyzing the equipment;
   improving the equipment based upon the equipment analysis;
   modularizing the maintenance procedures into maintenance modules; and
      for maintaining system functionality and for preventing functional failures, using a control system for determining when maintenance standards deviate from predetermined objectives, and using a feedback system which is responsive to determination of said deviation for causing a systematic analysis of the situation to be performed and the causes for the deviation to be identified, then based on the results of said analysis and identification, implementing modification of the maintenance strategy and the maintenance methods to achieve improvements and initiate equipment optimization;
   wherein the step of analyzing the equipment comprises the steps of:
   analyzing the failure modes of the equipment;
   selecting equipment using an ABC analysis technique based upon the failure modes of the equipment;
   generating component and function models for the selected equipment;
   performing a failure mode and effects analysis to generate severity, occurrence and detection classification using the component and function models;
   calculating a risk priority number for each cause of failure based upon the classification in each of the severity, occurrence and detection classifications; and
   classifying each cause of failure into a damage classification based upon the severity, occurrence and detection classifications.

2. The method of claim 1, wherein the step of analyzing the failure modes of the equipment is based upon at least one of frequency of failure occurrence, time required for repairs, location, cause, the type of equipment, failure factors and the failed components of the equipment.

3. The method of claim 1, wherein the step of selecting equipment using the ABC analysis technique comprises selecting equipment which causes at least 80% of failures.

4. The method of claim 1, the step of selecting equipment using the ABC analysis technique comprises selecting equipment which causes at least 80% of down time.

5. The method of claim 1, wherein the step of generating component and function models comprises breaking down each of the selected equipment into its basic components and into the basic functions of each of those basic components.

6. The method of claim 1, wherein the step of performing a failure mode and effects analysis comprises the steps of:
   identifying which component and function models;
   naming the damage to be analyzed based upon;
   indicating potential consequences of the named damage based upon;
   indicating possible causes of the named damage based upon;
   indicating current preventative measures;
   indicating current testing measures;
   classifying the named damaged according to severity;
   classifying the cause of the damage based upon the frequency of occurrence; and
   classifying the current preventative and testing measures based upon their detection potential.

7. The method of claim 1, wherein the step of classifying each cause of failure into damage classification comprises classifying each cause of failure into one of eight damage classifications.

8. The method of claim 1, wherein the step of improving the equipment based upon the equipment analysis comprises determining which of a short term measure process and a morphological method is to be applied to the results of the equipment analysis step.

9. The method of claim 8, wherein, if the determination is for a short term measure process, then the step of improving the equipment further comprises the steps of:
   preparing measures to be taken for failure-prone components;
   implementing the prepared measures; and
   repeating the failure mode and effects analysis and damage classification.

10. A method of optimizing equipment maintenance procedures comprising the steps of:
    analyzing the equipment;
    improving the equipment based upon the equipment analysis;
    modularizing the maintenance procedures into maintenance modules; and
       for maintaining system functionality and for preventing functional failures, using a control system for determining when maintenance standards deviate from predetermined objectives, and using a feedback system which is responsive to determination of said deviation for causing a systematic analysis of the situation to be performed and the causes for the deviation to be identified, then based on the results of said analysis and identification, implementing modification of the maintenance strategy and the maintenance methods to achieve improvements and initiate equipment optimization; wherein the step of improving the equipment based upon the equipment analysis comprises determining which of a short term measure process and a morphological method is to be applied to the results of the equipment analysis step; and wherein, if the determination is for a morphological method, then the step of improving the equipment further comprises the steps of:

defining the problem;

registering influencing parameters;

preparing alternative solutions for functions performed by the equipment;

determining evaluation criteria and their priorities;

comparing components and best practices solutions;

selecting components and combinations of solutions for entire systems;

evaluating the solutions.

11. A method of optimizing equipment maintenance procedures comprising the steps of:

analyzing the equipment;

improving the equipment based upon the equipment analysis;

modularizing the maintenance procedures into maintenance modules; and for maintaining system functionality and for preventing functional failures, using a control system for determining when maintenance standards deviate from predetermined objectives, and using a feedback system which is responsive to determination of said deviation for causing a systematic analysis of the situation to be performed and the causes for the deviation to be identified, then based on the results of said analysis and identification, implementing modification of the maintenance strategy and the maintenance methods to achieve improvements and initiate equipment optimization; wherein the step of improving the equipment based upon the equipment analysis comprises determining which of a short term measure process and a morphological method is to be applied to the results of the equipment analysis step; and further comprising:

performing a second failure mode and effects analysis to generate severity, occurrence and detection classification using the component and function models;

recalculating a risk priority number for each cause of failure based upon the classification in each of the severity, occurrence and detection classifications.

12. The method of claim 1, wherein the step of adjusting maintenance strategies comprises:

allocating maintenance concepts to equipment components based upon damage classifications.

13. The method of claim 1, wherein the step of modularizing the maintenance procedures comprises summarizing work from the areas of servicing, inspection and repairs into modules.

14. The method of claim 13, wherein each module is its own partial process.

15. The method of claim 13, wherein the step of modularizing the maintenance procedures comprises the steps of:

defining processes based upon existing servicing, inspection and repair work;

auditing the current processes;

analyzing the processes;

optimizing the processes;

designing inter-function processes;

standardizing the process elements; and describing the modules.

16. The method of claim 15, wherein the servicing, inspection and repair work are set forth in regulations, guidelines and quality standards.

17. The method of claim 15, wherein the step of auditing comprises the step of:

observing duties, work processes and procedures;

recording duties, work processes and procedures; and documenting duties, work processes and procedures.

18. The method of claim 17, wherein the documenting comprises recording process time, employee qualification, resources used and job description.

19. The method of claim 18, wherein the process time includes core time, preparation and setup time, traveling time, waiting time, personal time and idle time.

20. The method of claim 15, wherein the step of analyzing the processes comprises breaking down the process into individual steps.

21. The method of claim 15, wherein the step of optimizing the processes comprises the steps of:

improving the quality of the processes;

eliminating superfluous tasks; and optimizing the combined work of each task.

22. The method of claim 15, wherein the step of designing inter-function processes comprises:

replacing existing job allocation with specialized functions; and integrating corresponding processes to avoid unproductive delays.

23. The method of claim 15, wherein the step of standardizing the process elements comprises modifying ideal processes and steps and organizing the ideal processes and steps into models for transfer to other equipment.

24. A method of optimizing equipment maintenance procedures comprising the steps of:

analyzing the equipment;

improving the equipment based upon the equipment analysis;

modularizing the maintenance procedures into maintenance modules; and for maintaining system functionality and for preventing functional failures, using a control system for determining when maintenance standards deviate from predetermined objectives, and using a feedback system which is responsive to determination of said deviation for causing a systematic analysis of the situation to be performed and the causes for the deviation to be identified, then based on the results of said analysis and identification, implementing modification of the maintenance strategy and the maintenance methods to achieve improvements and initiate equipment optimization;

wherein the step of modularizing the maintenance procedures comprises summarizing work from the areas of servicing, inspection and repairs into modules;

wherein the step of modularizing the maintenance procedures comprises the steps of;

defining processes based upon existing servicing, inspection and repair work;

auditing the current processes;
analyzing the processes;
optimizing the processes;
designing inter-function processes;
standardizing the process elements, and
describing the modules; and
wherein the step of describing the modules comprises the steps of:
providing a module number
providing a module name;
providing an exact job description;
detailing the machines and devices require for each task;
defining the module time per module unit;
determining the number of employees and the qualifications of those employees;
determining deadlines: and
determining quantity structure.

* * * * *